United States Patent
Okuda et al.

(10) Patent No.: US 7,777,615 B2
(45) Date of Patent: Aug. 17, 2010

(54) SYSTEM FOR ASSISTING THE ATTACHMENT OF A TRAILER TO A VEHICLE

(75) Inventors: Masato Okuda, Novi, MI (US); Christian Arthur Trager, Canton, MI (US); Lisa Marie Brown, Ann Arbor, MI (US); Michael Wiegand, Birmingham, MI (US); Tanemichi Chiba, Novi, MI (US); Christopher Kurpinski, Berkley, MI (US); Jeffrey Edward Angeliu, Farmington, MI (US); Hirohiko Yanagawa, Chiryu (JP); Yoshihisa Sato, Nagoya (JP); Toshihiro Wakamatsu, West Bloomfield, MI (US); Justin McBride, West Bloomfield, MI (US); Thomas Keeling, Plymouth, MI (US)

(73) Assignees: Toyota Motor Engineering & Manufacturing North America, Inc., Erlanger, KY (US); Denso International America, Inc., Southfield, MI (US); Denso Corporation, Kariya-Shi (JP)

( * ) Notice: Subject to any disclaimer, the term of this patent is extended or adjusted under 35 U.S.C. 154(b) by 327 days.

(21) Appl. No.: 12/052,115

(22) Filed: Mar. 20, 2008

(65) Prior Publication Data
US 2009/0236825 A1 Sep. 24, 2009

(51) Int. Cl.
*G08B 21/00* (2006.01)
(52) U.S. Cl. .............. 340/431; 340/539.25; 340/686.2; 340/687; 340/691.6; 348/148; 280/477
(58) Field of Classification Search ................ 340/431, 340/539.25, 686.2, 687, 691.6; 348/36, 118, 348/148; 280/477, 478.1, 504, 511
See application file for complete search history.

(56) References Cited

U.S. PATENT DOCUMENTS

| | | | |
|---|---|---|---|
| 5,191,328 | A | 3/1993 | Nelson |
| 5,650,764 | A | 7/1997 | McCullough |
| 5,729,194 | A | 3/1998 | Spears et al. |
| 5,861,814 | A | 1/1999 | Clayton |
| 6,120,052 | A | 9/2000 | Capik et al. |
| 6,176,505 | B1 | 1/2001 | Capik et al. |
| 6,765,607 | B2 | 7/2004 | Mizusawa et al. |
| 6,900,724 | B2 | 5/2005 | Johnson |

(Continued)

OTHER PUBLICATIONS

RD-0414007, Sep. 20, 1998. Abstract.

*Primary Examiner*—Hung T. Nguyen
(74) *Attorney, Agent, or Firm*—Gifford, Krass, Sprinkle, Anderson & Citkowski, P.C.

(57) ABSTRACT

A system for assisting the alignment of a hitch pin mounted on the rear of a vehicle with a hitch socket mounted on the front of a trailer. The system includes a camera mounted to the vehicle and positioned to capture an image rearwardly of the vehicle. A video display is contained within the vehicle which displays the image captured by the camera. A processor is also contained in the vehicle which calculates a preferred path of travel of the vehicle to position the hitch pin in alignment with the hitch socket. The processor is programmed to provide instructions to an operator of the vehicle of the required steering to maintain the vehicle on the preferred path of travel. The processor recalculates the preferred path of travel whenever the vehicle veers from the preferred path of travel by a preset threshold.

21 Claims, 2 Drawing Sheets

U.S. PATENT DOCUMENTS

| | | |
|---|---|---|
| 6,970,184 B2 | 11/2005 | Hirama et al. |
| 7,005,974 B2 | 2/2006 | McMahon et al. |
| 7,006,127 B2 | 2/2006 | Mizusawa et al. |
| 7,034,861 B2 | 4/2006 | Okada et al. |
| 7,058,207 B2 | 6/2006 | Iida et al. |
| 7,151,443 B2 | 12/2006 | Dialinakis |
| 7,171,769 B2 | 2/2007 | Schultz et al. |
| 7,195,267 B1 | 3/2007 | Thompson |
| 2006/0044122 A1 | 3/2006 | Dialinakis |
| 2006/0255560 A1 | 11/2006 | Dietz |
| 2007/0058273 A1 | 3/2007 | Ito et al. |
| 2008/0180526 A1* | 7/2008 | Trevino ..................... 348/148 |

* cited by examiner

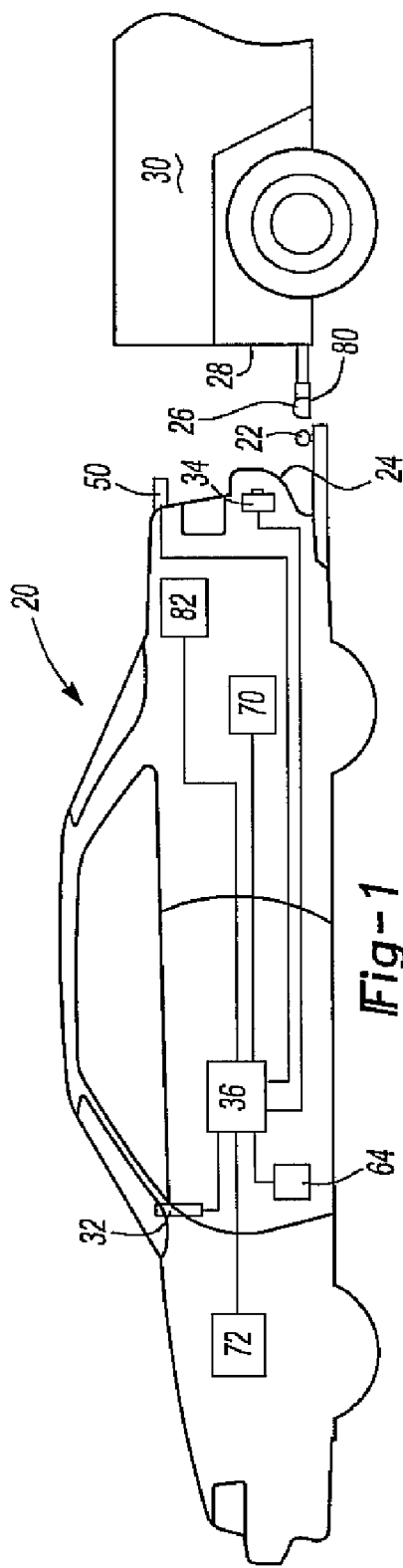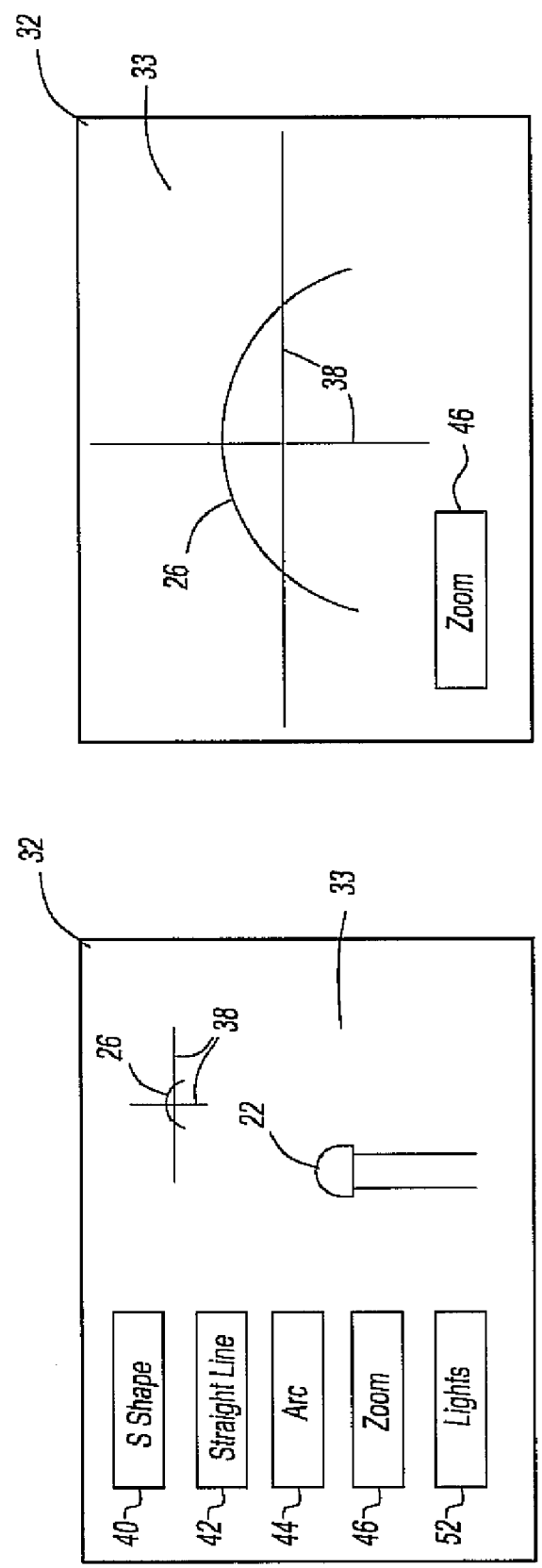

SYSTEM FOR ASSISTING THE ATTACHMENT OF A TRAILER TO A VEHICLE

BACKGROUND OF THE INVENTION

I. Field of the Invention

The present invention relates generally to a system for assisting the attachment of a trailer having a hitch socket to the rear of a vehicle having a hitch pin.

II. Description of Related Art

Many automotive vehicles are used as towing vehicles to tow trailers of one sort or another. For example, such towing vehicles often tow boat trailers as well as cargo trailers.

Conventionally, these previously known towing vehicles are provided with a hitch pin mounted to the rear of the vehicle and usually aligned with the center line of the vehicle. The hitch pin may assume any of several shapes, but commonly is in the shape of a ball.

The towed trailer includes a hitch socket at the front end of the trailer. This hitch socket is complementary in shape to the hitch pin. Consequently, for a spherical hitch pin, the socket will also be spherical in shape.

In order to attach the trailer to the towing vehicle, it is necessary that the hitch pin be inserted into the hitch socket. This is difficult to achieve since the operator of the automotive vehicle typically cannot see either the hitch pin or the hitch socket when attempting to align the hitch pin and hitch socket together. Often a second person outside the motor vehicle provides instructions to the operator of the vehicle in an attempt to align the hitch pin with the hitch socket. Even with a person outside the car directing the operator of the vehicle, often several different attempts are required before the proper alignment of the hitch pin and hitch socket is achieved.

In order to facilitate the attachment of a trailer to a towing vehicle, there have been a number of previously known systems which provide assistance to the operator of the vehicle. Many of these previously known systems, furthermore, provide an optical image of the hitch to the operator of the vehicle as well as driving instructions to the operator of the vehicle to facilitate the proper alignment of the hitch pin with the hitch socket. In some of these previously known systems, a preferred path of travel of the vehicle hitch pin toward the hitch socket is also displayed on the video screen so that the driver can steer the vehicle in an attempt to keep the hitch pin on the preferred path of travel.

Despite the visual assistance provided by these previously known systems to the operator of the vehicle, many operators of the vehicle are unable to carefully maintain the hitch pin along the preferred path of travel. This inability is due in large part to the fact that the vehicle is steered in the reverse direction. Such steering of the vehicle during rearward travel is difficult for many drivers to perform accurately.

Consequently, during a hitching operation even with these visually assisted previously known systems, many drivers tend to veer from the preferred path of travel of the hitch pin toward the hitch socket. When this occurs, the driver of the vehicle oftentimes over steers the vehicle in an attempt to correct the position of the hitch pin and return it to the preferred path of travel. This, however, oftentimes results in overshooting the preferred path of travel to such a degree that it is necessary to drive the automotive vehicle forwardly and restart the hitching operation.

SUMMARY OF THE PRESENT INVENTION

The present invention provides a system for assisting in the alignment of a hitch pin mounted to an automotive vehicle to a hitch socket on a towed trailer which overcomes the above-mentioned disadvantages of the previously known systems.

In brief, the system of the present invention comprises a camera which is mounted to the vehicle such that the camera is positioned to capture an image rearwardly of the automotive vehicle. Although the camera can be mounted anywhere that is visible to the rear of the vehicle, preferably the camera is mounted substantially in alignment with the hitch pin at the rear of the vehicle.

A video display is contained within the interior of the vehicle. The image captured by the camera is fed as an input signal to the video display so that the hitch socket as well as the hitch pin can be viewed by the operator of the vehicle from within the passenger compartment.

The system further includes a processor which is preferably a microprocessor which receives a plurality of input signals. Preferably, the video display includes a touch screen so that the operator of the vehicle may indicate on the touch screen the precise position of the hitch socket as it is displayed on the video display. Once the position of the hitch socket has been identified, the processor calculates a preferred path of the automotive vehicle to move the hitch pin in alignment with the hitch socket. This preferred path may assume several different shapes, such as an S shape, straight line, or curvilinear shape, and the desired shape may be selected and/or overridden by the operator of the vehicle through selection options displayed on the video display.

After the preferred path of travel has been calculated by the processor, the processor generates output signals to the video display to show the preferred path of travel of the hitch pin, and thus of the vehicle, to properly align the hitch pin with the hitch socket. The operator of the automotive vehicle then steers the automotive vehicle around the preferred path of travel to align the hitch pin with the hitch socket. During this steering operation and rearward travel of the motor vehicle, the processor optionally generates output signals to the video display instructing the vehicle operator of the direction and amount of steering needed to follow the preferred path of travel. The processor may also generate an output signal to the video display indicative of the distance between the trailer hitch pin and the trailer hitch socket. Alternatively, the processor generates audible output signals to speakers, such as the radio speakers, contained within the automotive vehicle of instructions of which way to steer the automotive vehicle as well as the distance between the hitch pin and the hitch socket.

Whenever the operator of the automotive vehicle veers from the desired path of travel by a preset threshold, the processor recalculates the preferred path of travel of the vehicle hitch pin and displays this recalculated preferred path of travel on the video display. In this fashion, overcorrection of the steering of the automotive vehicle in an attempt to return the automotive vehicle to the original preferred path of travel is obviated.

The present invention also includes many additional features in the system to facilitate the attachment of a trailer to an automotive vehicle, including automatic steering of the vehicle, which will subsequently be described in greater detail.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a diagrammatic view illustrating a preferred embodiment of the present invention;

FIG. 2 is a screen view illustrating the operation of the present invention prior to a hitching operation;

FIG. 3 is a zoom view of the trailer hitch socket;

DETAILED DESCRIPTION OF A PREFERRED EMBODIMENT OF THE PRESENT INVENTION

Figure 4:
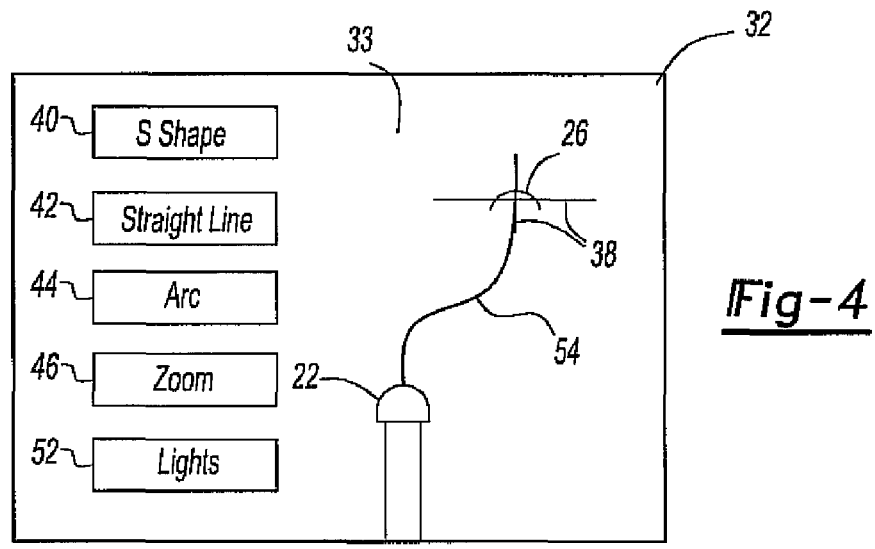
FIG. 4 is a view similar to FIG. 2, but illustrating the screen shot after calculation of the preferred path of travel.

With reference first to FIG. 1, an automotive vehicle 20 is illustrated having a hitch pin 22 attached to a rear end 24 of the vehicle 20. The hitch pin 22 in turn is adapted to cooperate with a hitch socket 26 mounted on a front end 28 of a trailer 30. The trailer 30 is of the type used to haul cargo, such as boats and the like.

Still referring to FIG. 1, a video display 32 is contained within the interior of the vehicle 20 such that the video display 32 is visible to the operator of the vehicle. Such video displays are oftentimes used for navigation systems and other purposes.

A video camera 34 is mounted to the vehicle 20 so that the video camera 34 provides a view rearwardly of the vehicle. Preferably, the camera 34 is mounted on the rear 24 of the vehicle and substantially aligned with the hitch pin 22. Consequently, the rear image captured by the camera 34 includes the hitch pin 22.

The output from the camera 34 is coupled as an input signal either directly to the video display 32 or through a processor 36 contained within the vehicle 20. This processor 36, which is preferably microprocessor based, receives not only the image captured by the camera 34 as an input signal, but also other signals inputted by the operator of the vehicle. For example, the video display 32 is preferably a touch screen so that data or other information may be inputted by the vehicle operator through the touch screen to the processor 36.

With reference now to FIG. 2, an exemplary screen shot on the video display 32 is illustrated and contains both the trailer hitch 26 as well as the hitch pin 22. In order to initiate the hitching operation, the vehicle operator identifies the position of the hitch socket 26 by either touching the position of the hitch socket 26 on the touch screen 33 or moving crosshairs 38 so that the crosshairs are aligned with the hitch socket 26.

With reference now to FIGS. 2 and 3, in order to facilitate the proper alignment of the crosshairs 38 with the hitch socket 26, the operator may select a zoom button 46 on the touch screen 33 which causes the view at the crosshairs 38 to be zoomed as shown in FIG. 3, the position of the crosshairs 38 can then be manipulated by the vehicle operator as desired until precise alignment with the socket 26 is achieved.

With reference now to FIGS. 1 and 2, in order to allow attachment of the trailer hitch pin 22 with the hitch socket 26 at night, a lamp 50 or other illumination means is optionally attached to the automotive vehicle 20 to illuminate the hitch pin 22 and hitch socket 26. The activation of the illumination means 50 may be either automatic through light sensors or, optionally, by selection of a touch button 52 on the touch screen 33.

With reference now to FIG. 4, the operator of the vehicle optionally may select the shape of the path of travel of the vehicle 20 during the hitching operation. To this end, buttons 40, 42 and 44 are displayed on the touch screen 33. Selection of the first button 40 selects an S shape for the path of travel while the button 42 selects a straight line for the path of travel and button 44 selects an arc for the path of travel from the hitch pin 22 to the hitch socket 26. For example, upon selection of the S shape by touching the button 40 on the touch screen 33, a preferred path of travel 54 of the hitch pin 22 to the hitch socket 26 is calculated by the processor 36 and displayed on the screen 32. At this time, the operator of the vehicle drives the automotive vehicle 20 in reverse steering the automotive vehicle so that the hitch pin 22 follows the preferred path of travel 54 as close as possible.

Figure 5:
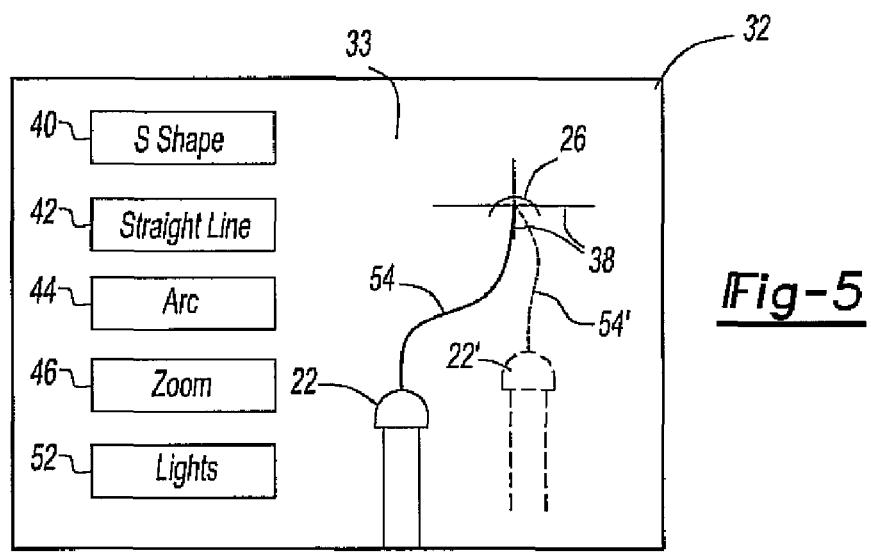
FIG. 5 is a view similar to FIG. 4, but illustrating an intermediate point during the hitching operation.

With reference now to FIG. 5, in some situations, the driver of the automotive vehicle is unable to follow the original preferred path of travel 54 and, instead, steers the vehicle until the hitch pin 22 reaches a position illustrated in phantom line at 22' in FIG. 5. Whenever the position of the hitch pin 22 varies from the preferred path of travel 54 by more than a predetermined threshold, the processor 36 recalculates the path of travel as a new path of travel 54'. This new path of travel 54' is displayed on the video display 32 and eliminates the previously known overcorrection of the vehicle operator when the hitch pin 22 deviates or veers from the path of travel 54 by more than a defined threshold. Such recalculation of the preferred path of travel 54, furthermore, will be iteratively repeated by the processor 36 as often as necessary until completion of the hitching operation. Furthermore the defined threshold may be selected by the user and preferable decreased as the distance between the trailer and vehicle decrease.

Figure 6:
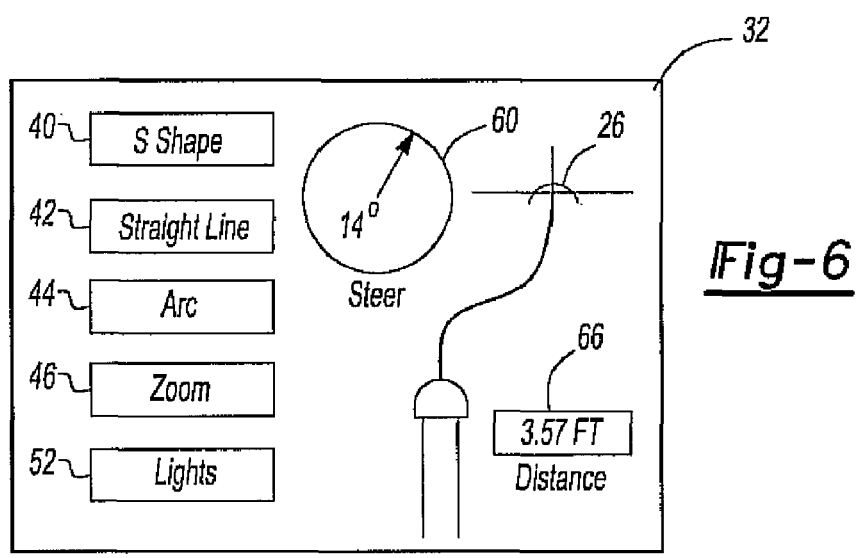
FIG. 6 is a view similar to FIG. 4, but illustrating other optional displays on the video display.

With reference now to FIG. 6, during the hitching operation, the processor 36 preferably provides instructions to the operator of the vehicle to facilitate the hitching operation. For example, a video display 60 may be placed on the video display 32 to indicate the desired position of the steering wheel and the steering angle. Alternatively, the processor 36 may provide output signals to one or more speakers 64 (FIG. 1) to provide audible instruction to the operator of the vehicle to achieve the hitching operation.

Similarly, the processor 36 may output video information to the video display 32 of the distance between the hitch pin 22 and hitch socket 26 as shown at 66. Such a video display facilitates the hitching operation by allowing the operator of the vehicle to more easily gauge the travel of the vehicle necessary to achieve the hitching operation.

With reference again to FIG. 1, after the hitch pin 22 is aligned with the hitch socket 26, the processor 36 optionally actuates means 70 to raise the hitch pin 22 up into the hitch socket 26. Any conventional means, such as an air suspension system, may be used as the means 70 to elevate the hitch pin 22 once aligned with the hitch socket 26.

Still referring to FIG. 1, the automotive vehicle 20 is optionally equipped with electronic steering 72 which enables the processor 36 to automatically control the vehicle steering 20 through the electronic steering 72. Consequently, in this embodiment of the invention, the processor 26 controls the vehicle steering 72 to maintain the hitch pin 22 along the preferred path of travel 54.

As a still further option, in order to facilitate the alignment of the hitch pin with the hitch socket 26, an RFID tag 80 may be attached to the hitch socket 26 while an RFID transceiver 82 is mounted to the vehicle 20. The RFID transceiver 82 provides an output signal to the processor 36 indicative of the position of the RFID tag 80, and thus the position of the vehicle hitch socket, to facilitate the hitching operation.

There are many modifications to the present invention without deviating from the spirit of the invention. For example, although the hitch socket 26 has been described as identified by the crosshairs 38 on the video display device 32, optionally pattern recognition may be used by the processor 36 to identify the hitch socket 26 from the image captured by the camera 34. Similarly, 3D laser or radar systems may be used to detect the position of the hitch socket 26. Likewise, sonar can also optionally be used to track the trailer hitch during the hitching operation.

Similarly, other types of useful information may optionally be displayed on the display device 32 without deviation from the spirit of the invention. For example, the camera view may be transformed and reversed for the convenience of the vehicle operator. Having described our invention, however, many modifications thereto will become apparent to those skilled in the art to which it pertains without deviation from the spirit of the invention as defined by the scope of the appended claims.

We claim:

1. A system for assisting the alignment of a hitch pin mounted on a rear of a vehicle with a hitch socket mounted on a front of a trailer comprising:
   a camera mounted to the vehicle, said camera positioned to capture an image rearwardly of the vehicle,
   a video display contained in the vehicle which displays the image captured by the camera,
   a processor contained in the vehicle which calculates a preferred path of travel of the vehicle to position the hitch pin in alignment with the hitch socket, said processor programmed to provide instructions to an operator of the vehicle of the required steering to maintain the vehicle on the preferred path of travel, and said processor recalculating said preferred path of travel whenever the vehicle veers from said preferred path of travel by a defined threshold.

2. The invention as defined in claim 1 wherein said processor provides said instructions by displaying said instructions on said video display.

3. The invention as defined in claim 1 wherein said processor provides said instructions by providing audible signals to the operator of the vehicle.

4. The invention as defined in claim 1 and comprising means for selecting a predetermined path shape for said preferred path of travel.

5. The invention as defined in claim 1 wherein said processor displays said preferred path of travel on said video display.

6. The invention as defined in claim 1 wherein said video display includes a touch screen to input information to said processor, and said processor programmed to input a desired shape of the preferred path of travel from said touch screen.

7. The invention as defined in claim 1 wherein said video display includes a touch screen to input information to said processor, and said processor programmed to input the position of the trailer hitch socket from said touch screen.

8. The invention as defined in claim 7 and said processor programmed to display a zoom image of the position of the trailer hitch socket.

9. The invention as defined in claim 1 and comprising means for illuminating a rear view of the vehicle.

10. The invention as defined in claim 1 wherein said processor is programmed to display the distance between said hitch pin and said hitch socket on said video display.

11. The invention as defined in claim 1 and comprising means for raising said hitch pin once aligned with the hitch socket.

12. The invention as defined in claim 1 and comprising means for automatically steering the vehicle along said preferred path of travel.

13. The invention as defined in claim 1 and comprising an RFID tag mounted to the hitch socket and a cooperating RFID transceiver mounted to the vehicle, said RFID transceiver generating an output signal to said processor which is used by said processor to calculate the preferred path of travel.

14. The invention as defined in claim 1 wherein said defined threshold is reduces as the distance between the trailer and vehicle is reduced.

15. The invention as defined in claim 14 wherein said defined threshold is user selected.

16. A system for assisting the alignment of a hitch pin mounted on a rear of a vehicle with a hitch socket mounted on a front of a trailer comprising:
   a camera mounted to the vehicle, said camera positioned to capture an image rearwardly of the vehicle,
   a video display contained in the vehicle which displays the image captured by the camera,
   a processor contained in the vehicle which calculates a preferred path of travel of the vehicle to position the hitch pin in alignment with the hitch socket, said processor programmed to provide instructions to an operator of the vehicle of the required steering to maintain the vehicle on the preferred path of travel, and
   means for illuminating a rear vision of the vehicle.

17. The invention as defined in claim 16 wherein said illuminating means comprises a lamp.

18. A system for assisting the alignment of a hitch pin mounted on a rear of a vehicle with a hitch socket mounted on a front of a trailer comprising:
   a camera mounted to the vehicle, said camera positioned to capture an image rearwardly of the vehicle,
   a video display contained in the vehicle which displays the image captured by the camera,
   a processor contained in the vehicle which calculates a preferred path of travel of the vehicle to position the hitch pin in alignment with the hitch socket, said processor programmed to provide instructions to an operator of the vehicle of the required steering to maintain the vehicle on the preferred path of travel, and
   means for raising the hitch pin when the hitch pin is aligned with the hitch socket.

19. The invention as defined in claim 18 wherein said raising means comprises means for lifting the rear of the vehicle.

20. The invention as defined in claim 18 wherein said lifting means comprises an air suspension system on the vehicle.

21. A system for assisting the alignment of a hitch pin mounted on a rear of a vehicle with a hitch socket mounted on a front of a trailer comprising:
   a camera mounted to the vehicle, said camera positioned to capture an image rearwardly of the vehicle,
   a video display contained in the vehicle which displays the image captured by the camera,
   a processor contained in the vehicle which calculates a preferred path of travel of the vehicle to position the hitch pin in alignment with the hitch socket, said processor programmed to provide instructions to an operator of the vehicle of the required steering to maintain the vehicle on the preferred path of travel, and provide a warning to the user if the vehicle veers from the said preferred path of travel by a defined threshold.

* * * * *